(12) United States Patent
Saint-Jalmes et al.

(10) Patent No.: US 7,744,035 B2
(45) Date of Patent: Jun. 29, 2010

(54) DOOR FOR COMPARTMENT OF THE BAGGAGE-COMPARTMENT TYPE

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 925 days.

(21) Appl. No.: 11/448,073

(22) Filed: Jun. 7, 2006

(65) Prior Publication Data

US 2006/0284017 A1    Dec. 21, 2006

Related U.S. Application Data

(60) Provisional application No. 60/697,351, filed on Jul. 8, 2005.

(30) Foreign Application Priority Data

Jun. 10, 2005    (FR)    ................................ 05 05904

(51) Int. Cl.
 B64C 1/14    (2006.01)
 E05F 11/00    (2006.01)
(52) U.S. Cl. .................. 244/129.5; 244/118.5; 49/360
(58) Field of Classification Search ............. 244/129.4, 244/129.5, 118.5; 49/360
 See application file for complete search history.

(56) References Cited

U.S. PATENT DOCUMENTS

| | | | | |
|---|---|---|---|---|
| 2,257,103 A | * | 9/1941 | Brokering ................. 244/118.6 |
| 2,445,131 A | * | 7/1948 | Wartian ..................... 244/129.5 |
| 2,989,304 A | * | 6/1961 | Ulmann ....................... 49/220 |
| 3,465,483 A | * | 9/1969 | Miller ........................... 52/72 |
| 3,585,757 A | * | 6/1971 | Ritchie et al. ................. 49/215 |
| 3,802,125 A | * | 4/1974 | Baker .......................... 49/360 |
| 3,992,751 A | | 11/1976 | Foster et al. |
| 4,375,876 A | * | 3/1983 | Stewart ..................... 244/129.5 |
| 4,503,784 A | * | 3/1985 | Turecek ....................... 110/176 |
| 4,984,387 A | * | 1/1991 | Wheatland ................... 49/362 |
| 5,181,677 A | * | 1/1993 | Kaplan et al. ............. 244/129.5 |
| 5,237,777 A | * | 8/1993 | Houston et al. ............... 49/360 |
| 5,249,392 A | * | 10/1993 | Houston et al. ............... 49/360 |
| 5,259,576 A | * | 11/1993 | Howard ..................... 244/129.5 |
| 5,271,183 A | * | 12/1993 | Hahn et al. ..................... 49/360 |
| 5,520,358 A | * | 5/1996 | Kahn et al. ............... 244/129.5 |
| 5,595,026 A | * | 1/1997 | Licking et al. ................ 49/360 |
| 5,673,874 A | * | 10/1997 | Howard ..................... 244/129.5 |
| 5,678,787 A | * | 10/1997 | Kahn et al. ............... 244/129.5 |
| 5,802,766 A | * | 9/1998 | Miyazaki et al. ............... 49/29 |
| 5,806,245 A | * | 9/1998 | Satrom ......................... 49/360 |

(Continued)

FOREIGN PATENT DOCUMENTS

DE    102 24 048    12/2003

(Continued)

*Primary Examiner*—Tien Dinh
*Assistant Examiner*—Joseph W Sanderson
(74) *Attorney, Agent, or Firm*—Oblon, Spivak, McClelland, Maier & Neustadt, L.L.P.

(57) ABSTRACT

This door is intended for a compartment, such as an aircraft baggage compartment. The door can be moved between a first position, in which it closes an opening of the compartment, and a second position, in which the opening is accessible. This door is provided with a guide system on both sides of the opening of the compartment to guide the door in a substantially vertical translational movement.

17 Claims, 4 Drawing Sheets

U.S. PATENT DOCUMENTS

| | | | |
|---|---|---|---|
| 6,189,833 B1 * | 2/2001 | Ambrose et al. | 244/129.5 |
| 6,290,175 B1 | 9/2001 | Hart et al. | |
| 6,481,156 B1 * | 11/2002 | Richmond | 49/24 |
| 6,615,545 B2 * | 9/2003 | Rogers et al. | 49/360 |
| 6,691,463 B1 * | 2/2004 | Richmond | 49/360 |
| 7,121,042 B2 * | 10/2006 | Robert et al. | 49/260 |
| 7,290,736 B2 * | 11/2007 | Pahl | 244/129.5 |
| 2002/0096405 A1 | 7/2002 | Gasser | |
| 2005/0066139 A1 | 3/2005 | Inoue et al. | |
| 2005/0067870 A1 | 3/2005 | Rezag et al. | |
| 2005/0116098 A1 * | 6/2005 | Martens et al. | 244/118.5 |

FOREIGN PATENT DOCUMENTS

| | | |
|---|---|---|
| EP | 0 417 822 | 3/1991 |
| EP | 0 899 192 | 3/1999 |
| GB | 446586 | 5/1936 |
| GB | 754832 | 8/1956 |
| WO | WO03/005360 | 1/2003 |
| WO | WO2005/030580 | 4/2005 |

* cited by examiner

DOOR FOR COMPARTMENT OF THE BAGGAGE-COMPARTMENT TYPE

The present invention relates to a door for a compartment, such as a baggage compartment. It relates more particularly to a baggage compartment disposed in an aircraft cabin at floor level of this cabin.

In general, baggage compartments in an aircraft cabin are disposed overhead and are fixed to the ceiling of the cabin. A door pivoting around a substantially horizontal shaft is disposed above the opening permitting access to the baggage compartment, and it permits the said opening to be closed.

It is also known that a baggage compartment can be integrated into a module intended to accommodate a passenger in an aircraft cabin. This baggage compartment is then disposed, for example, at floor level of the said cabin. Such a module integrating a baggage compartment of this type is disclosed, for example, by International Patent WO 2005/035360. The baggage compartment disclosed here has a horizontally sliding door. This solution permits good guidance of the door, which can rest on the floor of the aircraft cabin. Nevertheless, when this sliding door is opened, it sometimes can extend into the aisle intended as a passageway for the travelers and flight crew. This door therefore constitutes an obstruction in this passageway.

The objective of the present invention is therefore to provide a door that closes a compartment, such as in particular a baggage compartment disposed at floor level of an aircraft cabin, this door, in open position, not encroaching on the adjacent space. In the case of an aircraft baggage compartment, it is advisable to ensure that the open door does not encroach on the aisle from which the said compartment can be accessed. Of course, the proposed door will be capable of being opened and closed reliably a great number of times. Preferably the door will have to be held securely, both in open and in closed position.

To this end, the invention proposes a door intended for a compartment, such as an aircraft baggage compartment, which door can be moved between a first position, in which it closes an opening of the compartment, and a second position, in which the said opening is accessible.

According to the invention, the said door is provided, on both sides of the opening of the compartment, with guide means, so as to guide the door in a substantially vertical translational movement.

When such a door is opened, it remains in the same vertical plane. While it is being opened and closed, it is not displaced horizontally and so it does not encroach on the adjacent space disposed at the height of the compartment. Thus, in the case of an aircraft cabin baggage compartment, wherein the compartment is disposed on the floor of this cabin, the door of the baggage compartment, while it is being opened and closed, does not encroach on the adjacent space intended as a passageway for the passengers and flight crew.

As an example, the invention proposes an embodiment in which the guide means are provided, on each side of the opening of the compartment, with a guide system comprising on the one hand a substantially vertical guide rail forming a projecting male member and on the other hand a slideway, whose shape is complementary to that of the rail, so as to receive the guide rail and permit sliding movement thereof.

To improve the rigidity of the door, especially in its open position, it is advantageously provided that the guide means comprise, on each side of the opening of the compartment, a guide system, and that the guide systems extend vertically but with different orientations. In this case, the guide systems are preferably oriented perpendicular to one another.

To ensure, in the case of a mechanism comprising a guide rail and slideway, a compact assembly and a door having dimensions hardly larger than those of the opening to be closed, each guide system is additionally provided with, for example, an intermediate member disposed between the guide rail and the slideway.

For greater ease of use, a door according to the invention is provided, for example, on the one hand with means for retracting it into its open position and on the other hand with means for locking it in its closed position. In this way, the door opens automatically as soon as the locking means are unlatched. In this embodiment, the retracting means in a first alternative embodiment comprise a metal band that is elastically coiled, at least partly, and in a second alternative embodiment, a hydraulic and/or pneumatic cylinder.

To prevent the door from opening too quickly, especially when means for retraction into a position (open or closed) are provided, this door is advantageously provided with means capable of limiting its sliding speed.

The present invention also relates to:
a module provided with a seat as well as with a wall surrounding the seat, at least partly, characterized in that it is additionally provided with a baggage compartment, and in that a door such as described hereinabove makes it possible to close the access to this baggage compartment,
an aircraft cabin, characterized in that it is provided with at least one module such as defined hereinabove, and
an aircraft, characterized in that it is provided with at least one module such as defined hereinabove.

Details and advantages of the present invention will be better understood from the description hereinafter with reference to the attached schematic drawings, wherein.

Figure 1:
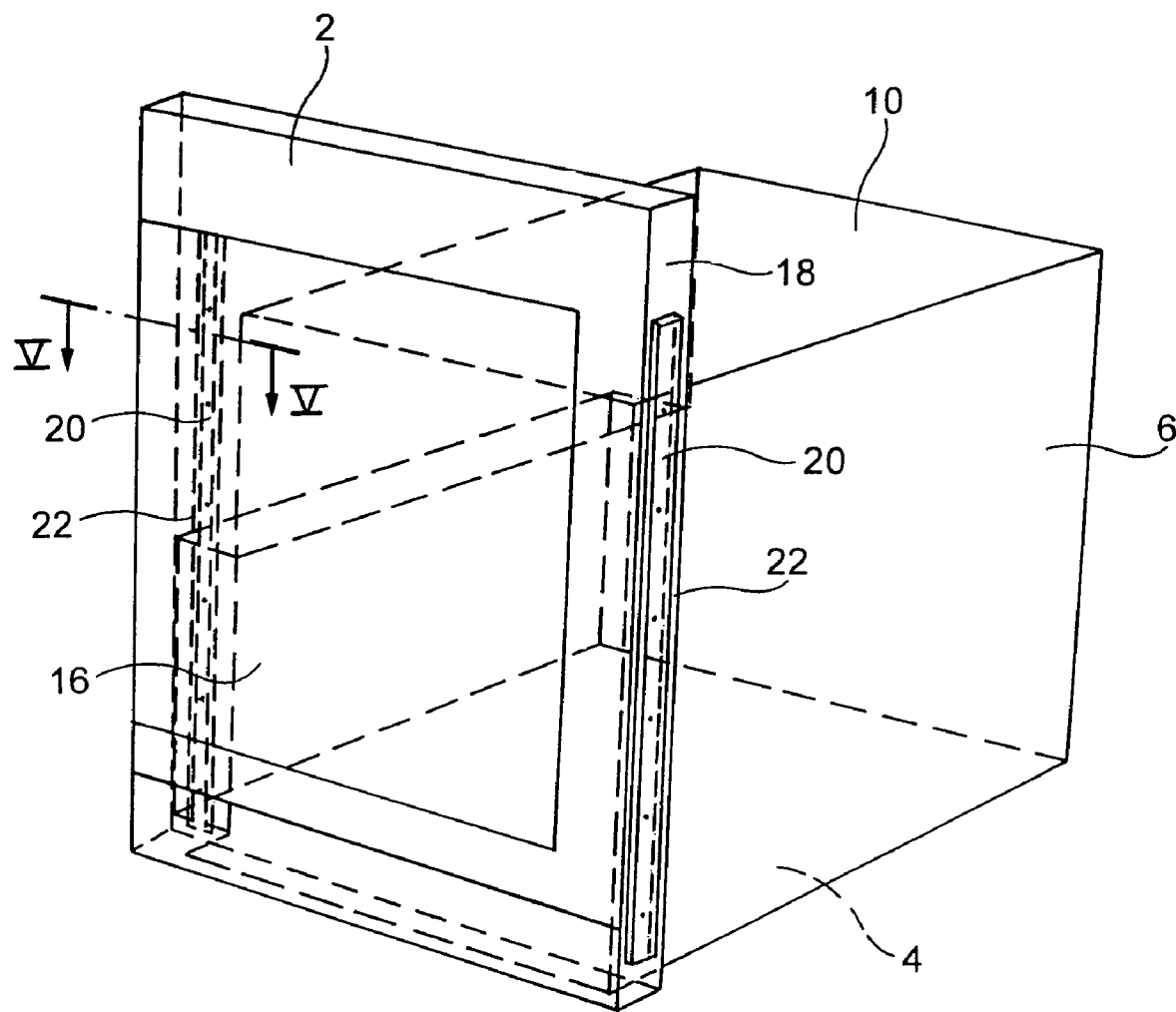
FIG. 1 is a schematic view of a baggage compartment and of a door according to the invention in closed position.
Figure 2:
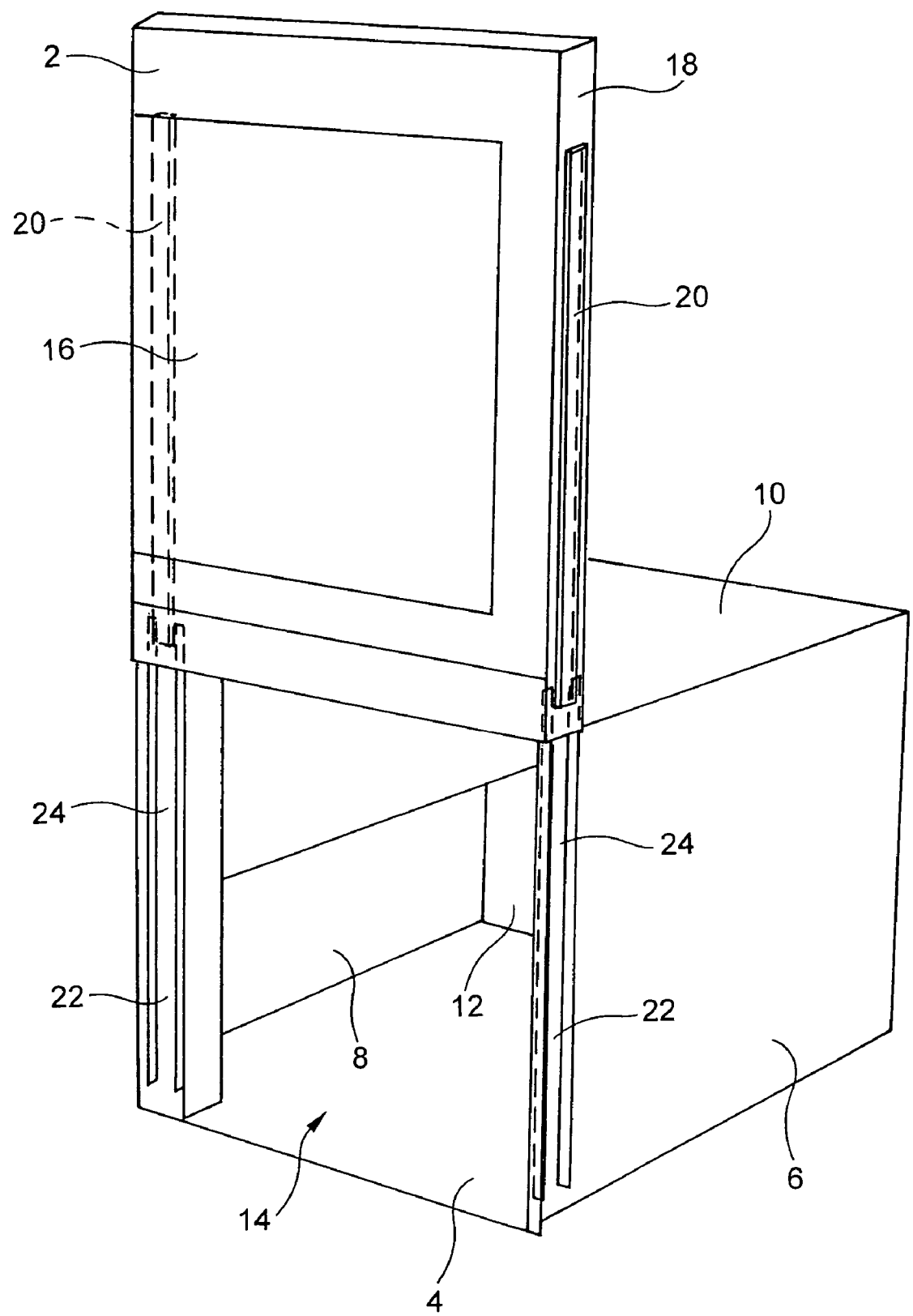
FIG. 2 shows the baggage compartment of FIG. 1 with the door in open position.

FIG. 1 shows a compartment closed by a door 2. Within the scope of this description, it is considered that this compartment is a baggage compartment intended as equipment for a module for an aircraft passenger. Such a module is, for example, of the type disclosed by the document cited in the preamble, or in other words International Patent WO 2005/035360. This baggage compartment is therefore disposed at the level of floor 4 of an aircraft cabin. This floor 4 therefore constitutes the bottom wall of the baggage compartment. The said compartment is also provided with a right side wall 6, a left side wall 8, a top wall 10 and a back 12 (FIG. 2).

Door 2 is a sliding door which, in a novel manner, is displaced in a vertical translational movement. Access to the baggage compartment is achieved via the face opposite back 12, which face is open. Door 2 permits this open face 14 to be opened and closed.

Door 2 has a main panel 16 as well as a flange 18. Main panel 16 is of rectangular shape, with dimensions larger than the corresponding opening of open face 14, which it faces when the door is in closed position.

Flange 18 in turn extends at right angles to main panel 16 over the entire height thereof, and it is disposed on the baggage-compartment side. In the practical example illustrated in the drawing, this flange 18 is disposed facing right side wall 6 of the baggage compartment when door 2 is in closed position.

Figure 3:
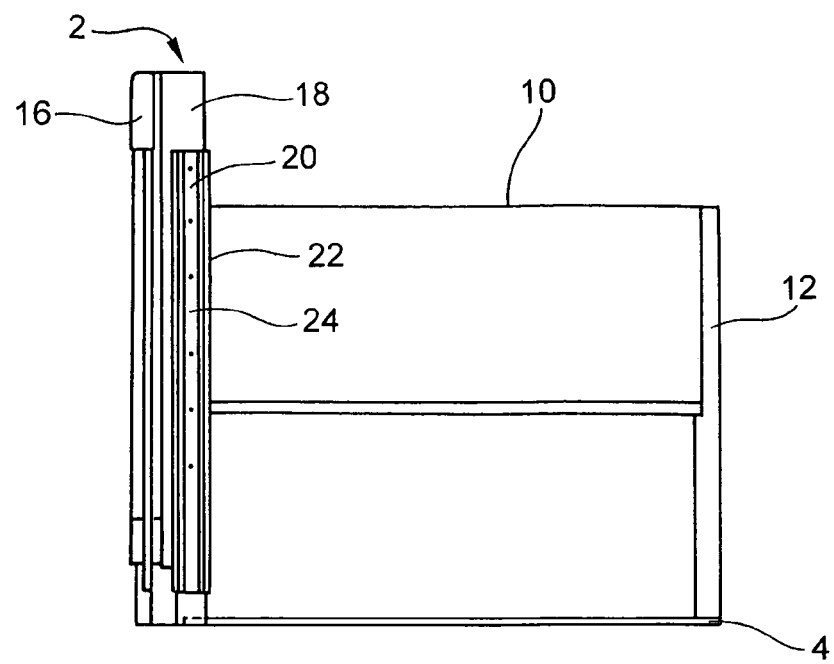
FIGS. 3 and 4 are side views corresponding respectively to FIGS. 1 and 2.
Figure 4:
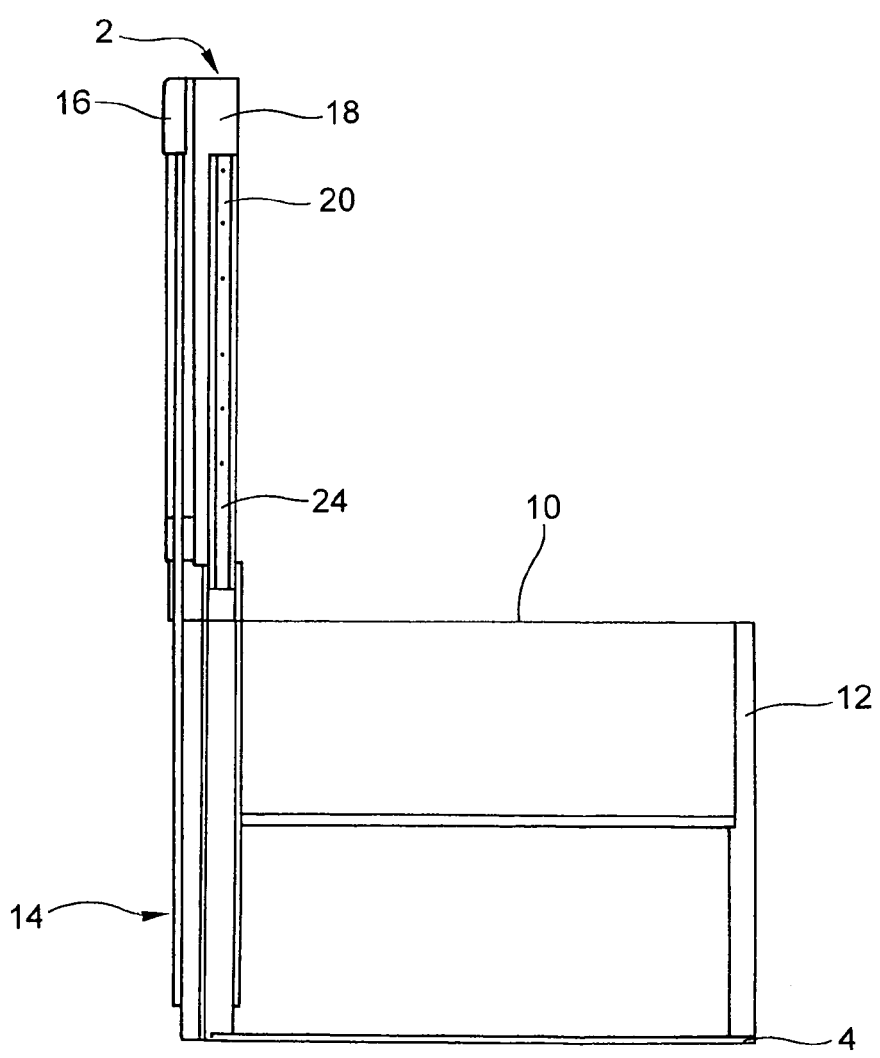

Guide means are disposed on both sides of open face 14 to ensure that door 2 is guided from its closed position (FIGS. 1 and 3) to its open position (FIGS. 2 and 4) and vice versa. Thus there are provided two guide systems which, in a preferred embodiment, are identical to one another. Each of these guide systems comprises on the one hand a guide rail 20 and on the other hand a slideway 22.

In the practical example shown in FIGS. 1 to 4, slideways 22 are fixed to the compartment closed by door 2. A first slideway 22 is fixed at the level of open face 14. It extends vertically in proximity to left side wall 8. Second slideway 22 in turn is fixed to right side wall 6. It also extends vertically and is disposed in proximity to open face 14 and in such a manner that it faces flange 18.

Guide rails 20 are fixed to door 2 in such a way that they can cooperate with slideways 22. Thus a first guide rail is fixed vertically on main panel 16 in proximity to the free edge thereof opposite flange 18. The other guide rail 20 in turn is fixed to flange 18 and also extends vertically.

The guide rails and slideways may have diverse shapes. These two elements have complementary shapes and, for example, form an assembly of mortise-and-tenon type. To allow door 2 to slide more easily, rolling bearings can be provided between guide rails 20 and corresponding slideways 22.

It is noted in FIGS. 1 to 4 and in the foregoing description that both guide systems extend vertically and thus define a vertical sliding axis. It also is noted that these two systems are differently oriented. In the described example, the systems are perpendicular to one another. This advantageous disposition permits door 2 to be held more securely, especially in its open position. By virtue of this disposition of the guide systems, these systems are able to resist forces exerted in the direction normal to panel 16 as well as forces exerted in a direction parallel to this panel 16.

For better resistance to the different forces that may be exerted on door 2, especially when it is in open position, and above all also to ensure also that the door-opening system is more compact, it is proposed here that an intermediate member 24 be advantageously added between each guide rail 20 and corresponding slideway 22. The length of this intermediate member 24 corresponds substantially to the length of a guide rail 20 or of a slideway 22. In closed position of door 2, the three elements of the guide system, comprising guide rail 20, slideway 22 and intermediate member 24, are all at the same height. When door 2 is opened, intermediate member 24 of a guide system is disposed at a substantially middle height between corresponding fixed slideway 22 and corresponding guide rail 20 which, being joined to door 2, is movable.

Figure 5:
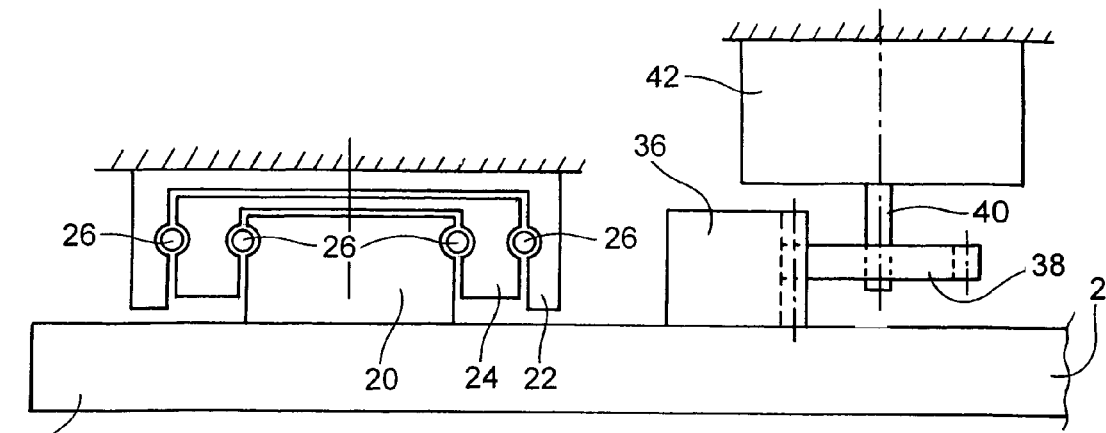
FIG. 5 is a partial view in section along section line V-V of FIG. 1 on an enlarged scale.

FIG. 5 illustrates one embodiment of such a guide system. In the embodiment illustrated here, each system is provided with bearing balls 26 between guide rail 20 and intermediate member 24 as well as between intermediate member 24 and slideway 22.

The fact that an intermediate member 24 is provided in the guide system makes it possible to achieve an assembly that is vertically more compact when door 2 is in closed position. To achieve comparable rigidity without an intermediate member, it would be advisable to elongate the slideways and guide rails, thus leading to a larger space requirement of the door.

Figure 6:
FIG. 6 is a schematic view illustrating a retracting mechanism and a locking mechanism for the compartment door of FIGS. 1 to 4, and FIGS. 7A and 7B respectively schematically represent, on a reduced scale and in front view, a door-opening mechanism in closed and open position respectively.
Figure 6:
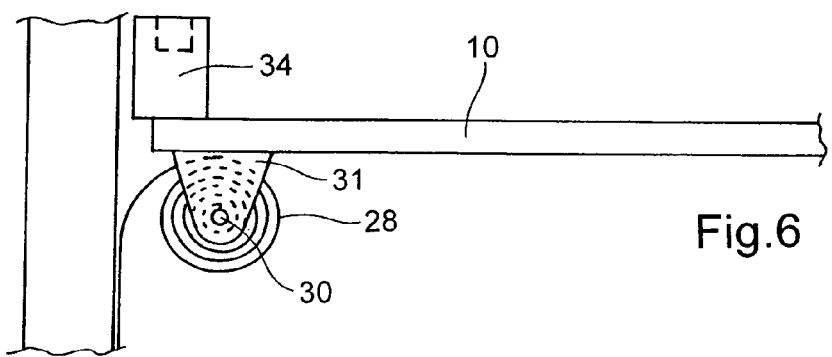

FIG. 6 illustrates a retracting mechanism capable of retracting door 2 into its open position. This mechanism is provided with a metal band 28 coiled around a shaft 30, fixed relative to the baggage compartment. One end of metal band 28 is fixed to shaft 30, while its other end is fixed to door 2. As an example, and as illustrated in FIG. 6, shaft 30 on which metal band 28 becomes coiled is mounted, by means of brackets 31, on the underside of top wall 10 of the baggage compartment. The trajectory of door 2 is such that the metal band is always hidden by the said door.

Depending on the dimensions of metal band 28, on the weight of door 2 and on possible other parameters, there may be provided the presence of a second metal band identical to metal band 28 and mounted in parallel relative thereto.

Figure 7A:
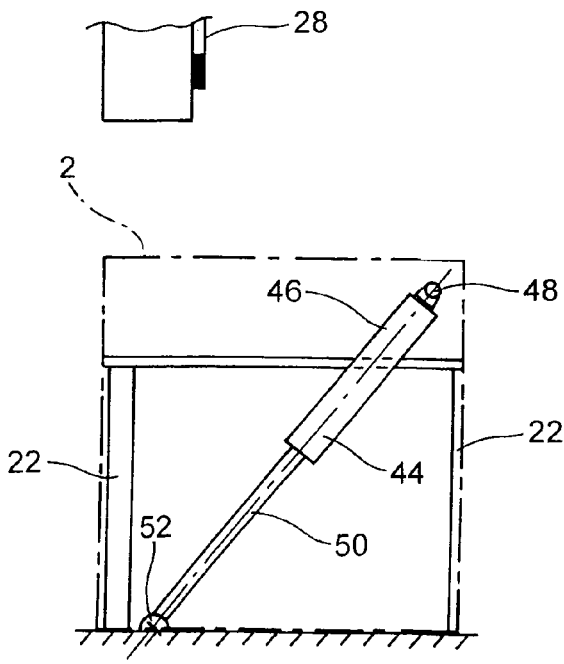
Figure 7B:
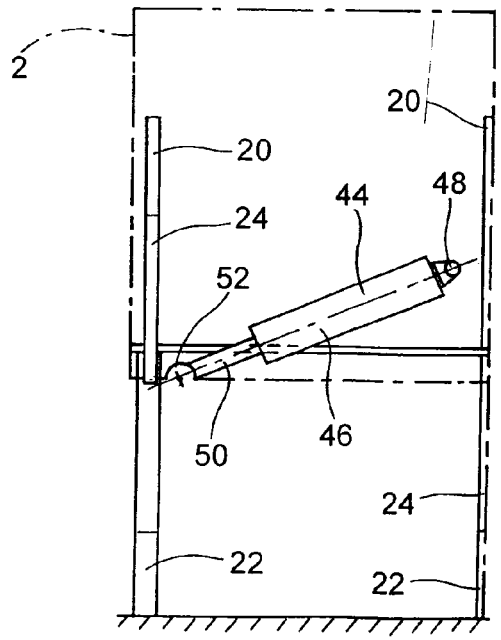

One alternative embodiment is illustrated in FIGS. 7A and 7B. In these figures, metal band 28 is replaced by a thrust cylinder 44. The latter controls the vertical translational movement of door 2. This thrust cylinder 44 is mounted slantwise. As an example, it may be a gas-filled cylinder. Nevertheless, a different type of thrust cylinder could be used here. This thrust cylinder 44 has a body 46 fixed by means of a head 48 on a fixed point disposed above open face 14. This head 48 can be fixed on top wall 10, for example by means of a support not illustrated. Head 48 is disposed in proximity to a first guide system. Thrust cylinder 44 also has a rod 50 fixed by means of a head 52 in the immediate proximity of the bottom edge of door 2. Head 52 is also disposed in proximity to the other guide system of the door. When rod 50 of thrust cylinder 44 travels into and out of body 46 of thrust cylinder 44, door 2 is raised and lowered as illustrated in FIGS. 7A and 7B.

FIG. 6 also shows a locking device with which door 2 can be kept closed despite the retracting force exerted by metal band 28. Such a locking device also may be used with thrust cylinder 44 (or any other retracting device). This locking device is provided with a bolt 32 that cooperates with a strike plate 34. It is proposed here that there be used a bolt 32 that latches into strike plate 34 and that is released from strike plate 34 when a pressure is exerted on bolt 32 in the direction of strike plate 34. Such a spring lock system is known to the person skilled in the art and will not be described in further detail here.

In order to control the translational speed of the door, especially while it is being opened, it is proposed that it be equipped with a mechanical speed-regulating device. Such a device is illustrated schematically in FIG. 5. The idea here consists in creating friction to limit the sliding speed of the door. This mechanism has a rack 36 fixed on the door so as to be parallel to guide rails 20. A roller 38 engages with rack 36. Roller 38 is carried by a shaft 40, which itself is mounted in a bracket 42. The latter is advantageously fixed on (or underneath) top wall 10 of the baggage compartment. By virtue of the friction generated, such a mechanism is capable of regulating the speed at which door 2 is raised.

The door described hereinabove can be opened and closed while remaining in the same vertical plane. Thus, when it is used to close an aircraft baggage compartment, this door does not encroach on the adjacent aisle. The guide systems described make it possible to provide a door having dimensions hardly larger than the dimensions of the corresponding opening. By virtue of the installation of the two guide systems one perpendicular to the other (any other relative orientation could be chosen), the door has great rigidity even when it is in its open position.

The mechanisms for retracting, locking and regulating the speed of displacement have been described by way of non-limitative examples, and they are optional. Each permits, in its own way, an improvement in the ease of use of the door. Thus, in order to open the door, the locking device can be unlatched simply by pressing down on the top of the door, and by virtue of the retracting device, the door opens without having to be pulled upward. To close it once again, it is sufficient to push the door downward until the bolt latches into its strike plate.

The present invention is not limited to the preferred embodiments described hereinabove as non-limitative examples. It also relates to all alternative embodiments that can be understood by the person skilled in the art within the scope of the claims hereinafter.

The invention claimed is:

1. A door for a compartment, the door being movable between a first position in which the door closes an opening of the compartment, and a second position, in which the opening of the compartment is accessible, the door comprising:
   two guide systems, one guide system provided on each lateral side of the opening of the compartment to guide the door in a vertical translational movement along a vertical sliding axis such that the door is maintained in a same vertical plane in the first and second positions, wherein each guide system comprises:
      a substantially vertical guide rail forming a projecting male member and a slideway having a shape complementary to that of the guide rail to receive the guide rail and permit a sliding movement of the guide rail; wherein
      the two guide systems extend vertically, but with different orientations relative to one another; and
   a first mechanism that applies an upward force on the door when the door is in the first position and a second mechanism that maintains, in a first configuration, the door in the first position while the upward force is applied by the first mechanism, and in a second configuration of the second mechanism the upward force automatically translates the door upwards into the second position,
   wherein the guide systems are oriented perpendicular to one another.

2. The door according to claim 1, wherein each guide system is provided with an intermediate member between the guide rail and the slideway, wherein the intermediate member has substantially a same length as the guide rail or the slideway and is disposed at a substantially middle height between a corresponding slideway and a corresponding guide rail when the door is in the second position.

3. The door according to claim 2, wherein the intermediate member is not fixedly connected to either the door or the compartment.

4. The door according to claim 1, wherein the first mechanism comprises a cylinder.

5. The door according to claim 4, wherein the first mechanism comprises a hydraulic cylinder.

6. The door according to claim 4, wherein the first mechanism comprises a pneumatic cylinder.

7. The door according to claim 1, further comprising means for limiting a sliding speed of the door as the guide rail slides on the slideway.

8. A module, comprising:
   a baggage compartment having an opening, wherein the door according to claim 1 closes the opening of the baggage compartment.

9. The module according to claim 8, wherein the module is configured to be disposed on a floor of an aircraft cabin.

10. The module according to claim 8, wherein the module is configured to be disposed in an aircraft.

11. A door for a compartment, the door being movable between a first position in which the door closes an opening of the compartment, and a second position, in which the opening of the compartment is accessible, the door comprising:
    two guide systems provided on each side of the opening of the compartment to guide the door in a substantially vertical translational movement, wherein each guide system comprises:
       a substantially vertical guide rail forming a projecting male member and a slideway having a shape complementary to that of the guide rail so as to receive the guide rail and permit a sliding movement of the guide rail; and
       an intermediate member having substantially a same length as the guide rail or the slideway and positioned between the guide rail and the slideway,
    wherein the intermediate member is not fixedly connected to either the door or the compartment,
    wherein the guide systems are oriented perpendicular to one another.

12. The door according to claim 11, comprising a first mechanism that retracts the door into the second position and a second mechanism that maintains the door in the first position.

13. The door according to claim 12, wherein the first mechanism comprises a hydraulic or a pneumatic cylinder.

14. The door according to claim 11, further comprising means for limiting a sliding speed of the door as the guide rail slides on the slideway.

15. A module, comprising:
    a baggage compartment having an opening, wherein the door according to claim 11 closes the opening of the baggage compartment.

16. The module according to claim 15, wherein the module is configured to be disposed on a floor of an aircraft cabin.

17. The module according to claim 15, wherein the module is configured to be disposed in an aircraft.

* * * * *